United States Patent [19]

Schneider Huddleston Virta et al.

[11] Patent Number: 5,897,630

[45] Date of Patent: Apr. 27, 1999

[54] SYSTEM AND METHOD FOR EFFICIENT PROBLEM DETERMINATION IN AN INFORMATION HANDLING SYSTEM

[75] Inventors: Lynn Christine Schneider Huddleston Virta; Charles Robert McKelley, Jr.; Jeffrey Scott Sims, all of Austin, Tex.

[73] Assignee: International Business Machines Corporation, Armonk, N.Y.

[21] Appl. No.: 08/804,862

[22] Filed: Feb. 24, 1997

[51] Int. Cl.[6] .................................................. G06F 15/18
[52] U.S. Cl. ............................................. 706/45; 706/46
[58] Field of Search ................................... 706/50, 45, 46; 371/29; 364/DIG. 1, DIG. 2; 395/600, 650

[56] References Cited

U.S. PATENT DOCUMENTS

| | | | |
|---|---|---|---|
| 4,654,852 | 3/1987 | Bentley et al. | 371/29 |
| 4,831,541 | 5/1989 | Eshel | 364/200 |
| 5,010,551 | 4/1991 | Goldsmith et al. | 371/16.4 |
| 5,047,977 | 9/1991 | Hill et al. | 364/900 |
| 5,287,505 | 2/1994 | Calvert et al. | 395/600 |
| 5,432,932 | 7/1995 | Chen et al. | 395/650 |

*Primary Examiner*—Tariq R. Hafiz
*Attorney, Agent, or Firm*—Leslie A. Van Leeuwen

[57] ABSTRACT

The present invention is directed to a system and method for system problem determination in an information handling system. The present invention is a seamless collection of parts that provides users with the information needed to determine the source of a problem. After entering the problem determination system of the present invention, the user is presented with a variety of choices. The user chooses a particular problem determination tool. In response to the user's choice, a particular tool is then located, wherever it may exist in the system, and executed. All sources of problem determination information are made available to the user. The location of the information is irrelevant. Furthermore, because all problem determination tools are presented to the user in one, cohesive problem determination system, the problem determination system can reuse error and support information already available, thus eliminating costly maintenance and translation costs.

4 Claims, 13 Drawing Sheets

SYSTEM AND METHOD FOR EFFICIENT PROBLEM DETERMINATION IN AN INFORMATION HANDLING SYSTEM

TECHNICAL FIELD OF THE INVENTION

The invention relates to the field of information handling systems. More particularly, the invention relates to a system and method for coordinating independent problem determination programs and data into a seamless user interface for efficient problem determination in an information handling system.

BACKGROUND OF THE INVENTION

One of the most exasperating problems facing information handling systems users is determining the source of a system problem, and then determining how to fix the problem. Often a user notices a system problem, but does not know where to begin to solve the problem. The user may not even know if the problem is hardware- or software-related.

Prior art problem determination methods usually involve many separate mechanisms, such as online books and files, hardcopy books, problem databases, assorted error messages, and telephone support. However, there are several problems associated with these prior art problem determination techniques. Users may not know what problem determination information is available, or may not know how to access or use the information. Much redundant information is kept. There is often information overlap between the product, the online books and databases, and the hardcopy books. This results in additional expense to maintain all the different sources of problem determination data, and to keep them all current and in sync with each other. Furthermore, a user often has to read through much more information than she needs or wants in order to determine the source of a system problem.

In order to use the prior art problem determination techniques, a user has to know they are available. An online book is of no use to a user if the user does not know the online book exists. Even if the user knows the online book exists somewhere in the system, the user may not know how to access the online book. In addition, one online book may not completely solve the user's problem. The user may have to determine how to access and execute several different problem determination programs to solve a single problem. Prior art problem determination programs may not be interactive. The user simply reads through information until she finds data that is useful.

There are further problems associated with hardcopy error manuals. Often, hardcopy books are out of date and the information they provide is not the most current problem solving information available. Even online error message manuals are often out of date. New error codes and error messages are added to programs that run on the system, but often the corresponding online error message manual is not updated concurrently. Furthermore, even if someone remembers to update the online error information, it is expensive to translate the online error information into the many languages required. All error information is translated twice, once in the actual code and again for the online error manual. This is both redundant and expensive.

Telephone support is also expensive. Many systems users complain about the high cost and the wait time involved in using a telephone system support line. Often, many users call system support with the same question or problem. The information on how to solve the particular problem is thus known, but the user either can not access the information or does not even know that it is available.

Consequently, it would be desirable to have a system and method for problem determination that puts all available troubleshooting information into the user's hands in one seamless problem determination application. It would also be desirable to eliminate redundant sources of information, and also to eliminate the need for costly telephone support calls. Further, it would be desirable to allow the user access to a variety of different types of problem determination programs and data, including interactive problem-solving programs, databases of previously solved problems, and programs which determine the cause of specific error symptoms and error identifiers, and give the user actions to take which will solve particular errors.

SUMMARY OF THE INVENTION

Accordingly, the present invention is directed to a system and method for system problem determination in an information handling system. System users are provided with the information needed to determine the source of a problem. The system of the present invention is a seamless collection of parts that makes troubleshooting as easy as clicking a hypertext link. After entering the problem determination system of the present invention, the user is presented with a variety of choices. The user chooses a particular problem determination tool. In response to the user's choice, a particular tool is then located, wherever it may exist in the system, and executed. The particular tool located and executed is designed to assist the user with problem determination and resolution.

The present invention also teaches a method of using the problem determination system. In addition, one of the embodiments of the invention is as sets of instructions resident in an information handling system.

The present invention has the advantage of allowing the user access to a variety of pre-existing or new problem determination tools. The problem determination tools made available to the user may include interactive programs, databases of problems previously solved, or cause and action information regarding specific error symptoms or error identifiers. All sources of problem determination information are made available to the user. The location of the information is irrelevant. Furthermore, because all problem determination tools are presented to the user in one, cohesive problem determination system, the problem determination system can reuse error and support information already available, thus eliminating costly maintenance and translation costs.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
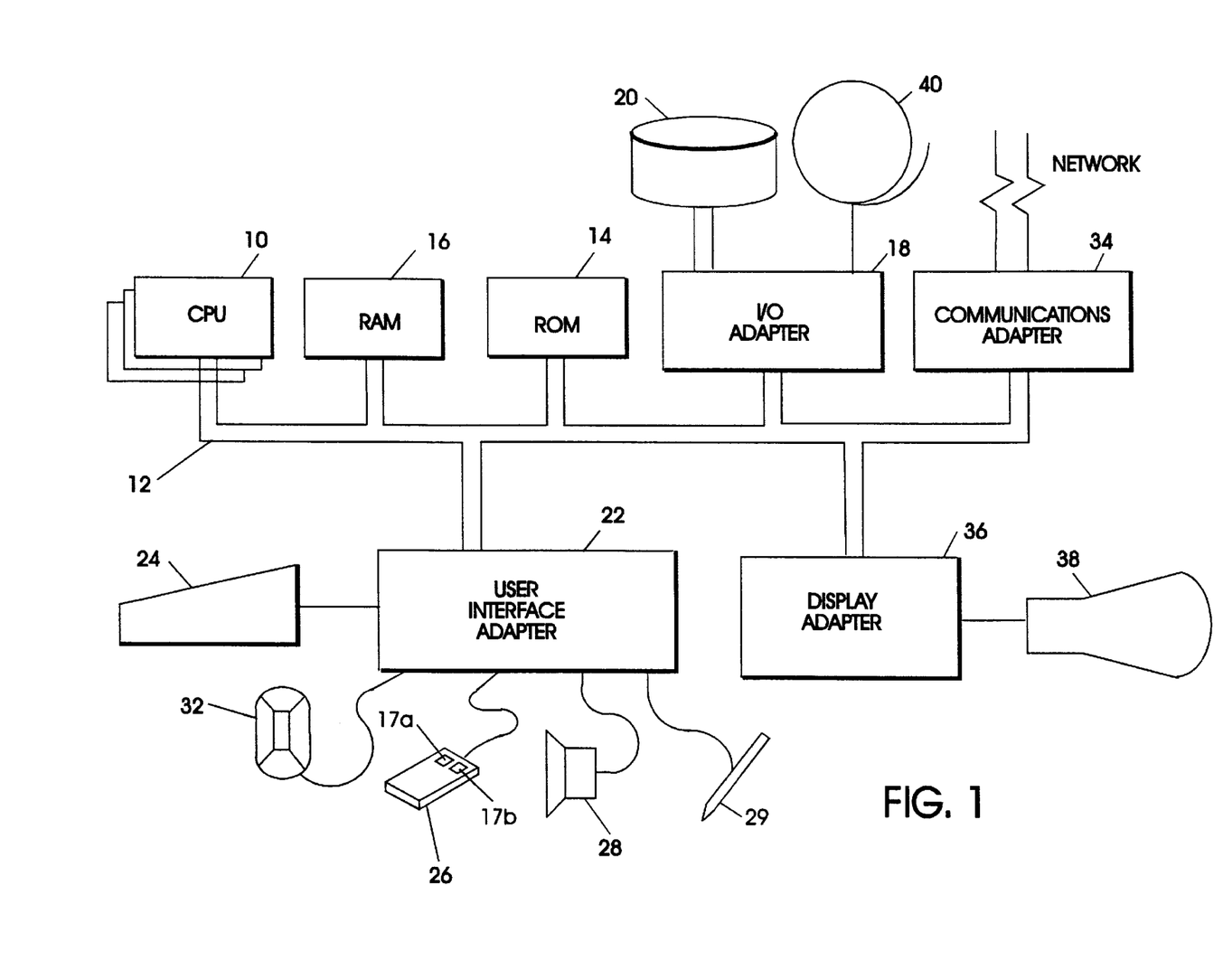
FIG. 1 is a block diagram of an information handling system capable of executing the problem determination system of the present invention.

The invention may be implemented on a variety of hardware platforms, including personal computers, workstations, minicomputers, and mainframe computers. Many of the steps of the method according to the present invention may be advantageously implemented on parallel processors of various types. Referring now to FIG. 1, a typical configuration of an information handling system that may be used to practice the novel method of the present invention will be described. The computer system of FIG. 1 has at least one central processing unit (CPU) 10. CPU 10 is interconnected via system bus 12 to random access memory (RAM) 16, read only memory (ROM) 14, and input/output (I/O) adapter 18 for connecting peripheral devices such as disk units 20 and tape drives 40 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38.

Communication adaptor 34 may link the system depicted in FIG. 1 with hundreds or even thousands of similar systems, or other devices, such as remote printers, remote servers, or remote storage units. Because of the size and complexity of both local area networks and wide area networks, such as the Internet, it is often difficult for a user to determine the cause of a system problem. Often a user does not even know all the programs and tools available to help her diagnose the cause of a system problem and determine a resolution. The present invention provides a system and method for efficient, cost-effective, and user-friendly problem determination, regardless of the complexity of the information handling system used.

Figure 2:
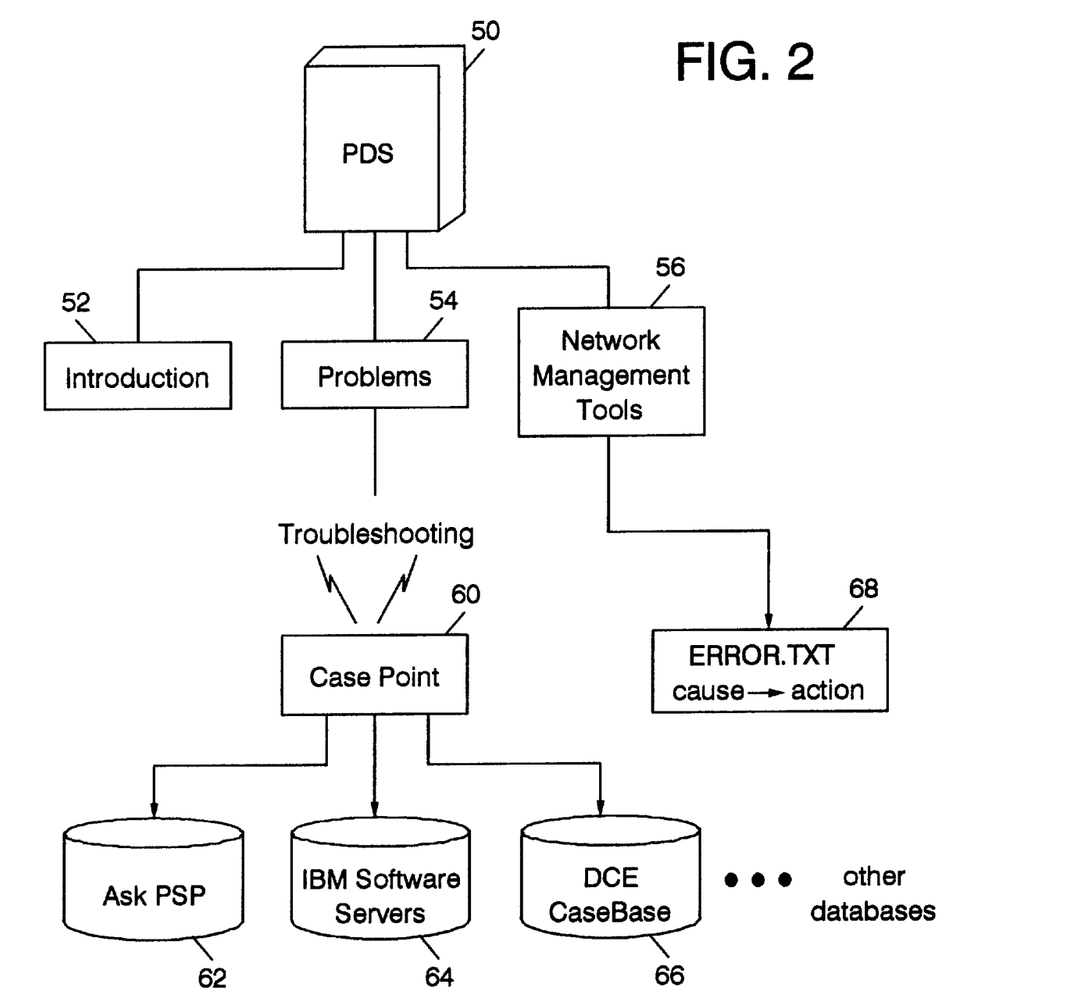
FIG. 2 is a block diagram illustrating the problem determination system of the present invention.

Referring to FIG. 2, a problem determination system, PDS 50, according to the present invention, will now be described. PDS 50 resides in RAM 16 of the information handling system depicted in FIG. 1. Note that all or some of PDS 50 may be stored on a diskette, hard drive, or CD-ROM until executed. PDS 50 may be implemented in many ways, encompassing many different types of problem solving tools. The specific tools described in the preferred embodiment are used for illustrative purposes only, and are not meant to be limiting.

In the described embodiment of PDS 50, there are four sections associated with PDS 50. Introduction section 52 contains introductory material and information which explains how to use PDS 50, and provides a user with an overview of PDS 50. Problem section 54 contains problem determination tools which the user may select to determine the source of a system problem. Problem section 54 allows the user access to several types of troubleshooting tools which make use of CasePoint search engine 60 (CasePoint is a copyrighted product of Inference Corporation). CasePoint 60 allows a user to interactively search problem determination databases, referred to as CaseBases. Examples of CaseBases include AskPSP 62, IBM Software Servers 64, DCE (Distributed Computing Environment) CaseBase 66, and other databases. CaseBases contain data regarding various problem symptoms and resolutions of the problems causing these problem symptoms. CaseBases are often developed by storing data obtained regarding problems previously found by other users, and the associated resolutions to these problems.

PDS 50 also contains Network Management Tools section 56. Network Management Tools section 56 determines the cause of a problem by accessing a file, referred to as ERROR.TXT 68. ERROR.TXT 68 is a file that already exists and is used by the products installed in the system depicted in FIG. 1. ERROR.TXT 68 is used by programs executing in the system. Rather than duplicate ERROR.TXT 68 message causes and actions, Network Management Tools section 56 accesses ERROR.TXT 68 directly. ERROR.TXT 68 is used to provide a user with a cause and an action, or resolution, for specific error symptoms or error identifiers (error IDs). Translation costs associated with maintaining separate error message manuals in numerous languages can be considerable. Reusing ERROR.TXT 68 as part of PDS 50 saves the time and expense of maintaining separate, online error manuals.

Figure 3:
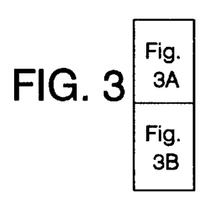
FIGS. 3 and 4 are flow charts illustrating a method for determining the source of a problem using the problem determination system of the present invention.
Figure 3A:
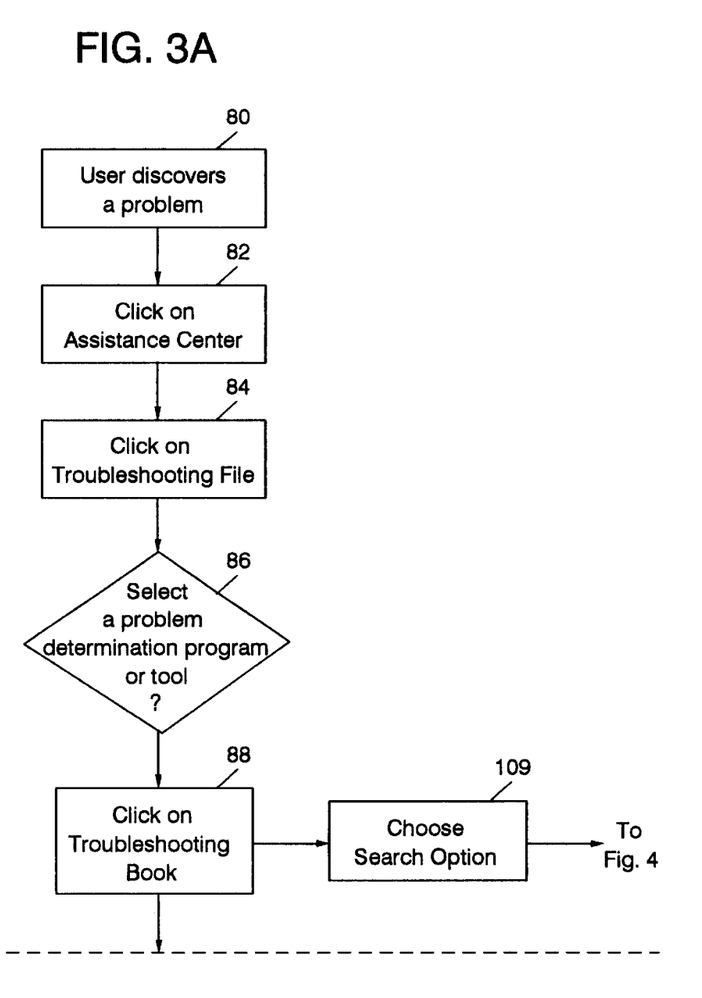
Figure 3B:
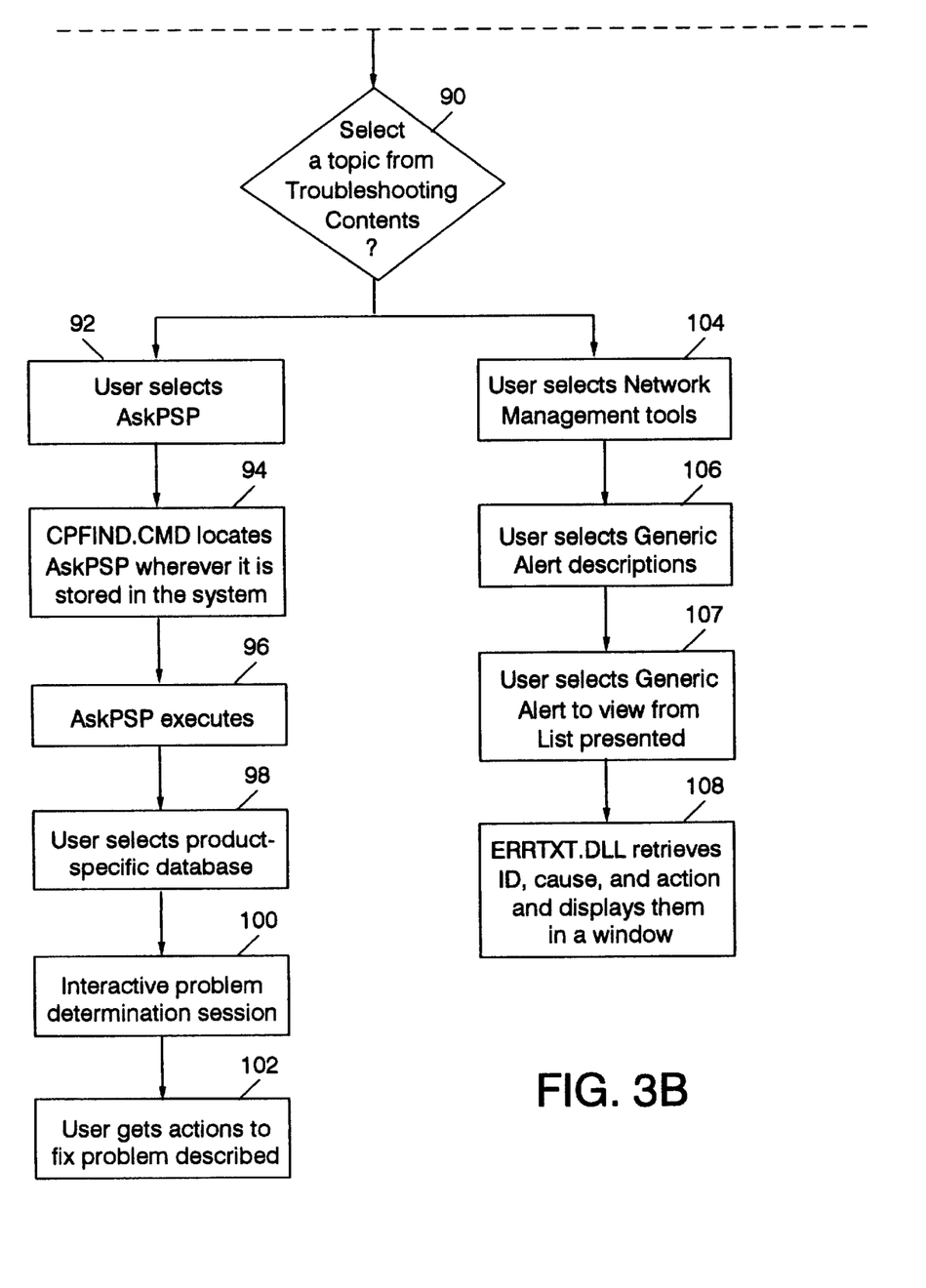
Figure 4:
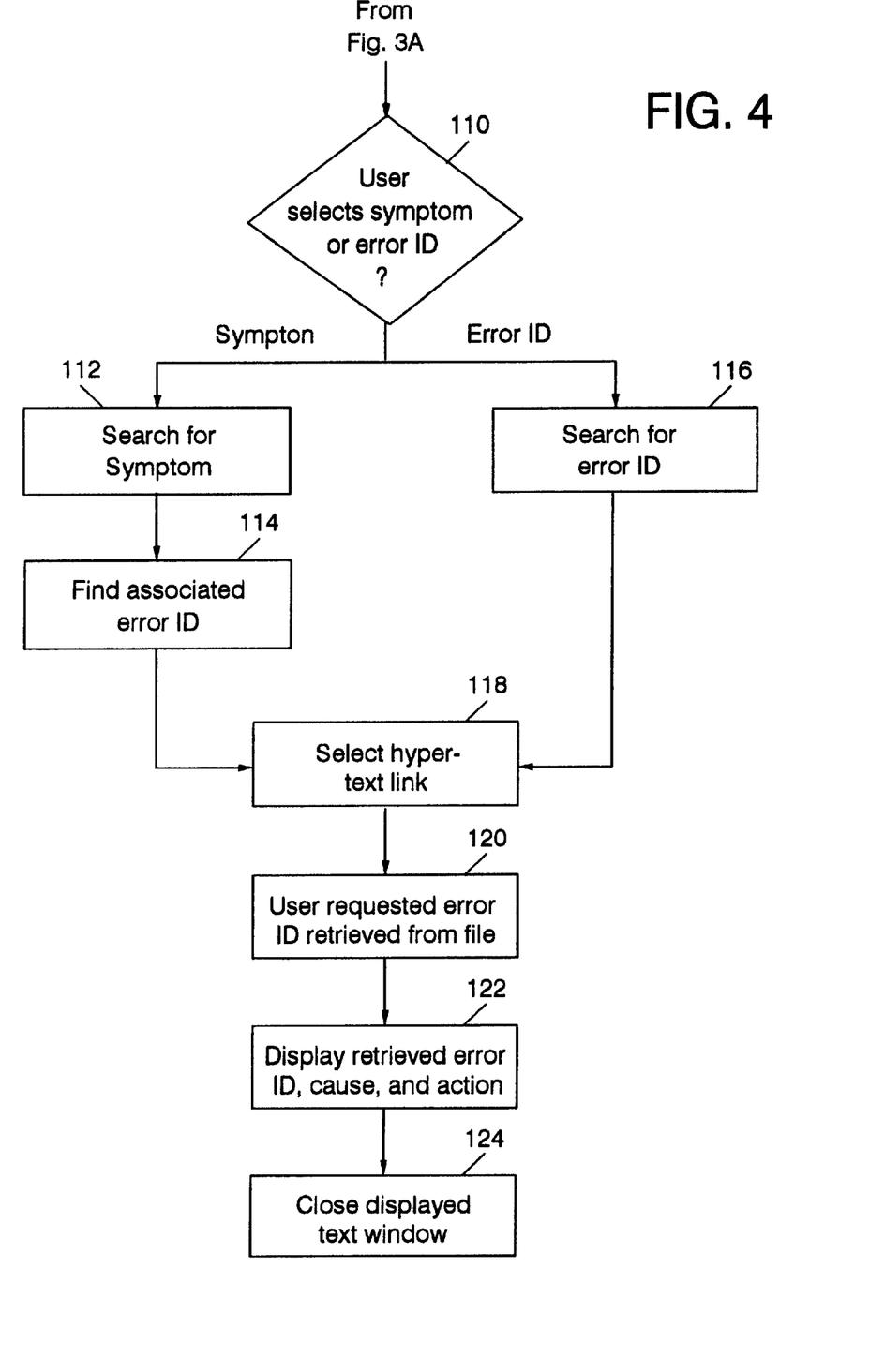

FIGS. 3 and 4 illustrate one embodiment of a method of using PDS 50 to determine the source of a problem in accordance with the present invention. Screen displays, illustrating the steps in FIGS. 3 and 4, are described below with reference to FIGS. 5 through 9.

Referring now to FIG. 3, when a user determines that there is a problem (step 80) in the information handling system (shown in FIG. 1), the user uses mouse button 17a to select an Assistance Center icon (step 82). The user is then presented with several choices, from which the user selects the Troubleshooting file (step 84). Depending on the type of problem determination the user wishes to pursue, the user next selects a particular problem determination program or tool (step 86). It is important to note that many choices may be presented to the user, including, but not limited to trace tools, a presentation manager dump formatter, support through the Internet, a hard file monitor, a system error log, remote support, various browsers, and any other type of tool or program which could help a user determine the cause of a system problem. One advantage of the present invention is that it presents all available problem determination choices to the user in an easy-to-find and easy-to-use interface.

In the described embodiment, the user selects the Troubleshooting book (step 88). This displays a table of contents, from which the user may again select from a multitude of problem determination programs and tools (step 90). FIG. 3 illustrates two of the choices that may be made by the user. For example, the user may select the AskPSP program (step 92). A program referred to as CPFIND.CMD locates AskPSP wherever it may be stored in the information handling system (step 94). Unlike prior art problem determination systems, which require a user to know where a particular problem determination program is stored, CPFIND.CMD finds AskPSP for the user. The code segment below illustrates a REXX implementation of CPFIND.CMD:

```
/* This program opens the AskPSP folder on the desktop       */
/* It is called from the Problem Determination Guide         */
call RxFuncAdd "SysLoadFuncs", "RexxUtil", "SysLoadFuncs"
call SysLoadFuncs
/* Find drive where OS/2 is installed                        */
os2path = left(os2path, 2)
rc = SysOpenObject('<AOS2WARP>','Default','False')
if rc = 0
then
  say "AskPSP was not found."
call SysSleep 3
exit
```

Still referring to FIG. 3, after CPFIND.CMD locates AskPSP (step 94), AskPSP executes (step 96). The user is presented with a selection of product-specific databases, referred to as CaseBases. The user selects one or more of the product-specific databases (step 98). AskPSP then runs an interactive problem determination session (step 100) with the user, where the user answers specific questions. Each answer results in further questions being asked by AskPSP until the source of the problem is determined, and actions, referred to as resolutions, are provided to fix the problem (step 102).

The user may also select to use the Network Management tools (step 104). The user then selects the Generic Alert descriptions (step 106). At this point, the user is presented with a list of Generic Alerts. Note that "Generic Alerts" are just one type of error that may occur in the information handling system. The system and method of the present invention may be used to handle any type of system error messages. The method used to handle Generic Alerts is presented for illustrative purposes, and is not meant to limit the types of errors which may be handled by PDS 50.

The user then selects a particular error ID from the list presented and clicks on the desired error ID (step 107). A dynamically linked library, referred to as ERRTXT.DLL then executes and retrieves the desired error ID, cause, and action from a product file (step 108). ERRTXT.DLL uses the product source file, ERROR.TXT, to obtain the error cause and action requested.

It is also possible to access the information contained in ERROR.TXT immediately after accessing the Troubleshooting book (in step 88). After accessing the Troubleshooting book, the user may choose a Search Option (step 109). Now referring to FIG. 4, after choosing the Search Option, the user is then prompted to enter either an error symptom or an error ID (step 110). If the user enters an error ID, the ERRTXT.DLL program searches for the error ID entered (step 116). If the user enters an error symptom, the ERRTXT.DLL program searches for the symptom (step 112), and then finds the corresponding error ID (step 114). ERRTXT.DLL then uses a hypertext link (step 118) to access the ERROR.TXT file and retrieve the appropriate error ID information from ERROR.TXT (step 120). The error ID, cause, and action (i.e. resolution) are then displayed for the user (step 122), and finally the displayed text window is closed (step 124).

Figure 5:
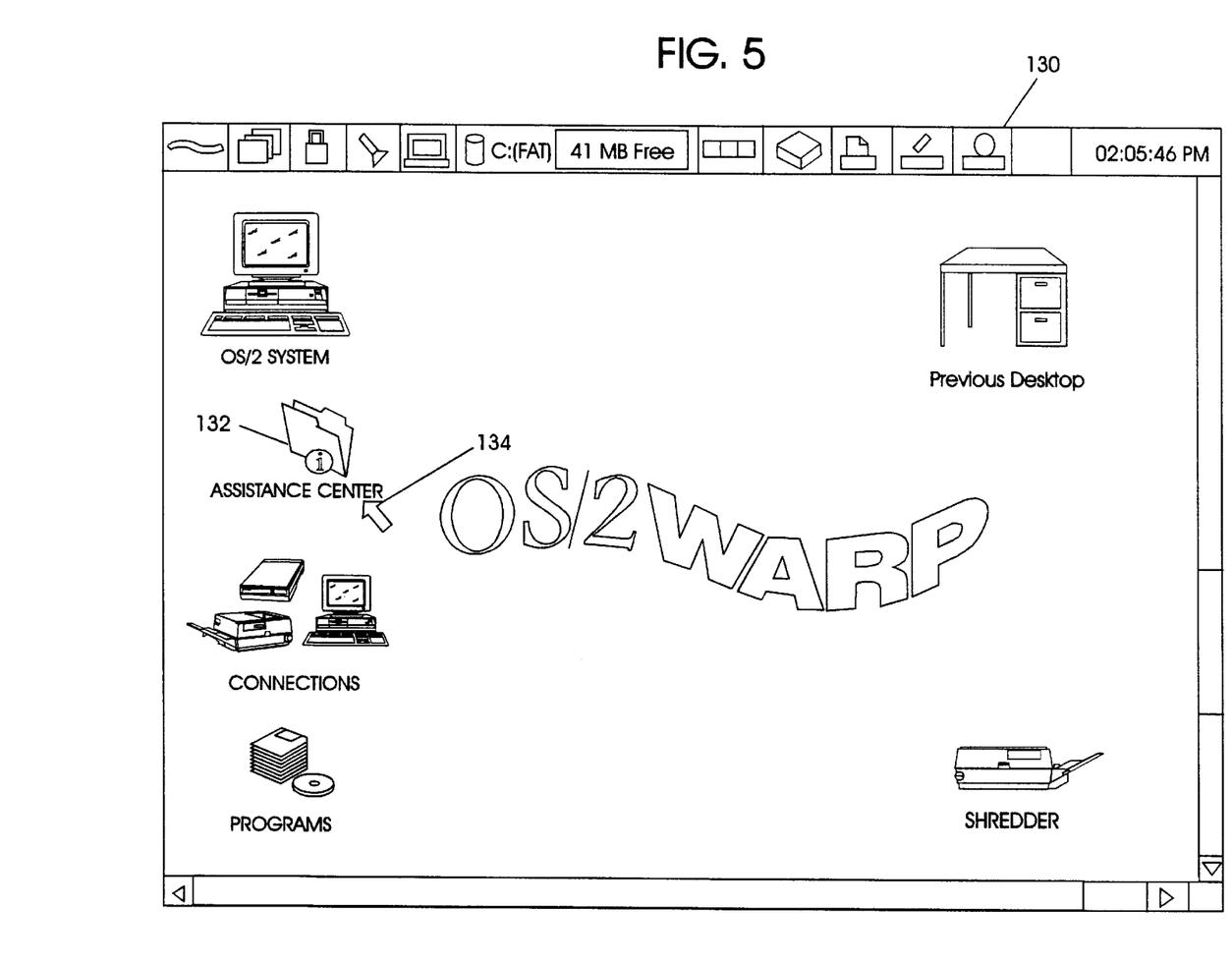
FIG. 5 is a screen display depicting an icon used by a user to access the problem determination system of the present invention.

FIGS. 5 through 11 depict graphical user interface screens which may be used to implement the system and method of the present invention. Referring now to FIG. 5, a screen display 130 is depicted. Screen display 130 is presented to the user on display device 38 of FIG. 1. Screen display 130 includes Assistance Center icon 132. To access the problem determination system of the present invention, a user selects Assistance Center icon 132, using cursor 134. Typically, a user will select a particular icon by using mouse 26 to move cursor 134 on screen display 130. To select Assistance Center icon 132, the user moves cursor 134 over Assistance Center icon 132, and double-clicks mouse button 17a.

Figure 6:
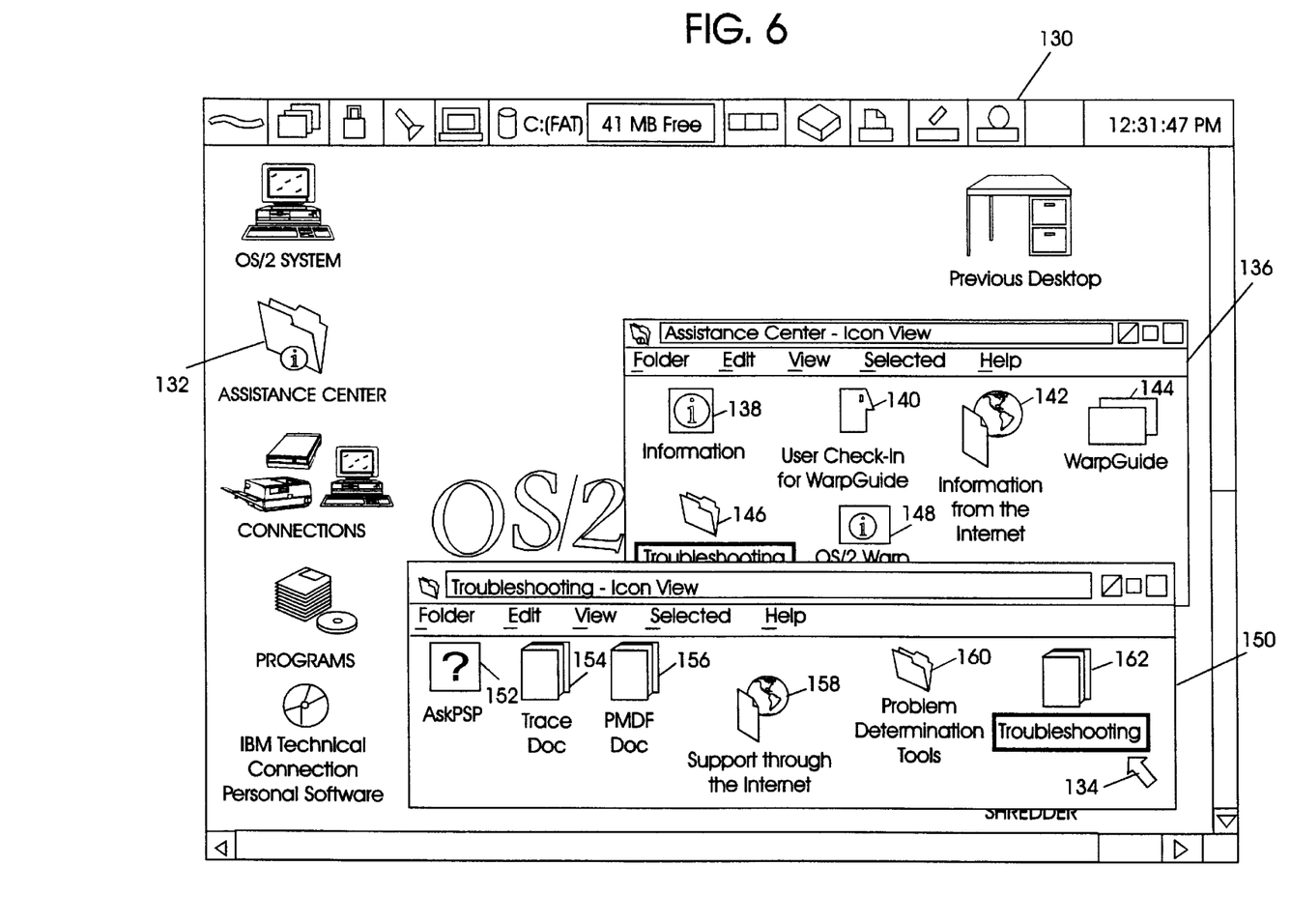
FIG. 6 is a screen display depicting the window displayed after the user chooses to enter the problem determination system of the present invention, and depicting a further window displayed after the user chooses a troubleshooting option of the present invention.

Referring now to FIG. 6, Assistance Center-Icon View window 136 is shown. Window 136 is displayed as a result of the user selecting Assistance Center icon 132. Window 136 contains Assistance Center icons 138 through 148. To continue accessing the problem determination system, the user next selects Troubleshooting icon 146. This selection causes Troubleshooting-Icon View window 150 to appear on screen display 130. Window 150 presents the user with six problem determination choices in this particular embodiment. The problem determination choices are represented by icons 152 through 162. As can be seen in window 150, many different types of problem determination tools and programs may be presented to the user. In the described embodiment, the user selects the Troubleshooting book icon 162.

Figure 7:
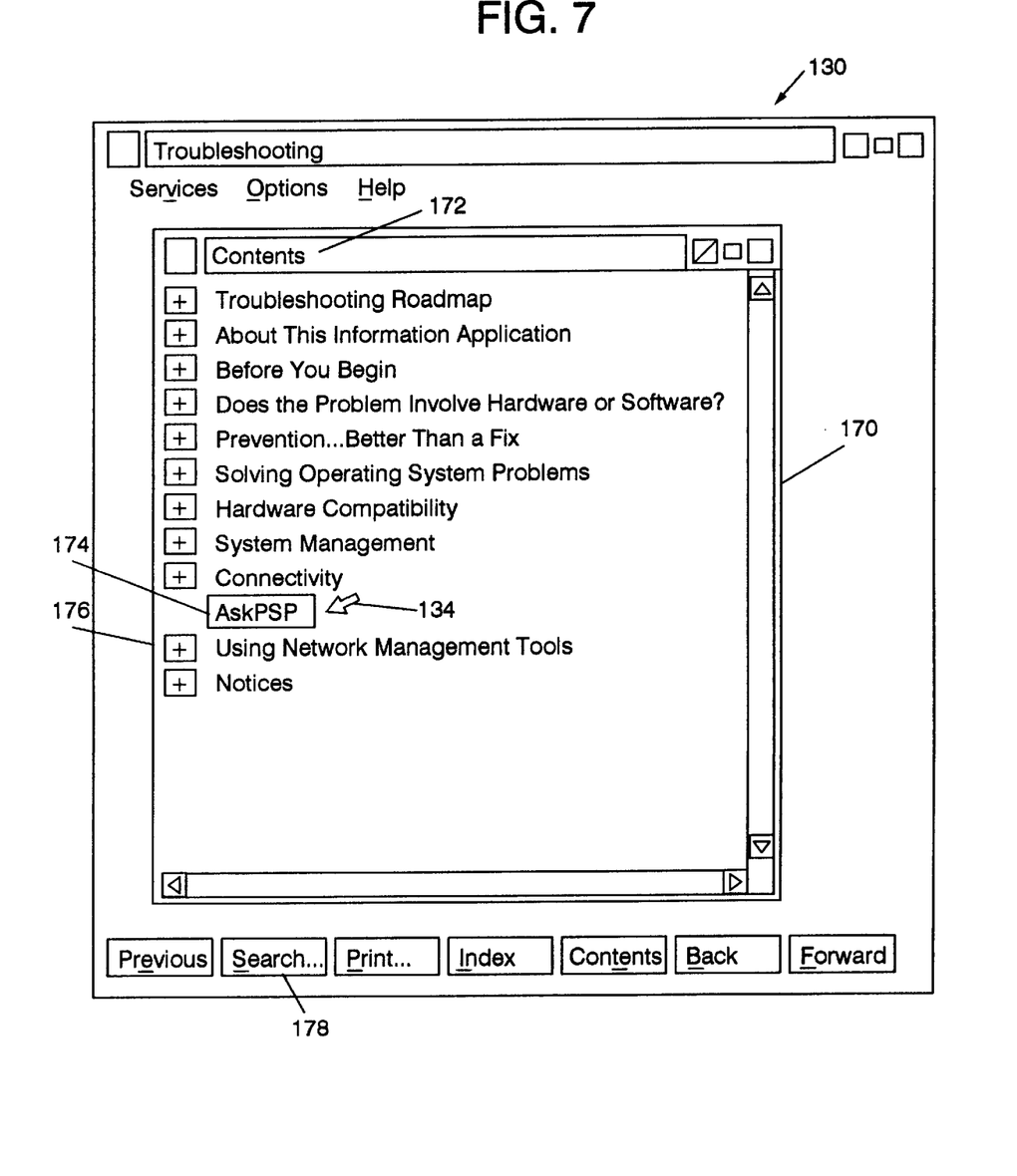
FIG. 7 is a screen display depicting the table of contents of an online troubleshooting information application.

Selecting icon 162 opens the Troubleshooting book window 170, as shown in FIG. 7. The user then selects Contents 172, which presents the user with many programs and tools. The user may then use cursor 134 to select AskPSP 174 or Using Network Management Tools 176. In FIG. 7, the user is shown double-clicking on AskPSP 174. This results in AskPSP-Icon View window 180 being opened, as shown in FIG. 8.

Figure 8:
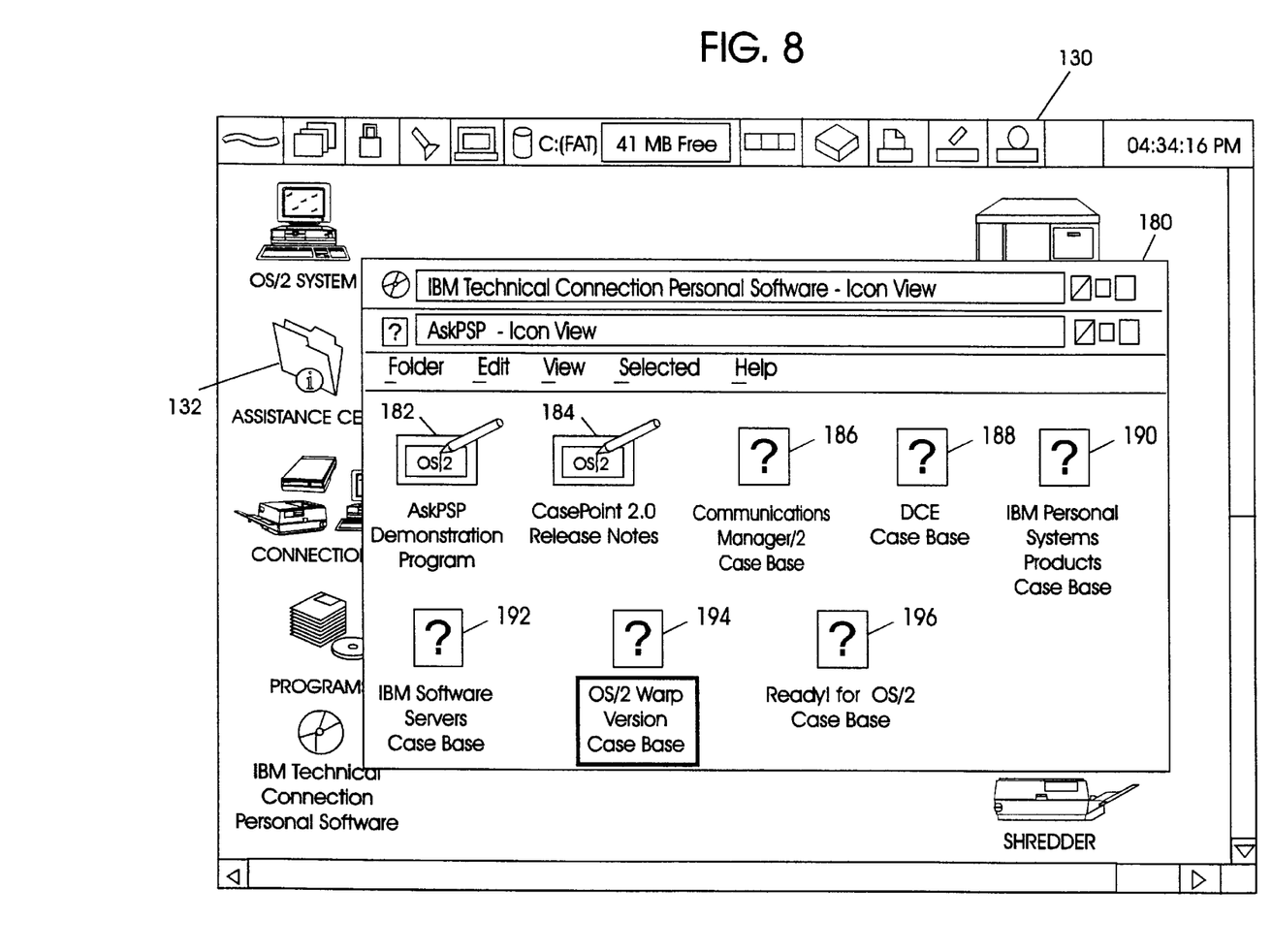
FIG. 8 is a screen display depicting a window displayed in response to a user selection of a topic from the table of contents displayed in FIG. 7.

Referring now to FIG. 8, the user may choose to see an AskPSP demonstration program (icon 182), may choose to read CasePoint release notes (icon 184), or may select one or more of CaseBases 186 through 196. In FIG. 8, the user selects the OS/2 Warp version CaseBase 194. At this point, AskPSP would execute an interactive problem solving session with the user, designed to assist the user in determining the source and resolution of an OS/2 Warp problem.

Similar screen displays and windows may be used if a user chooses to access ERRTXT.DLL through the table of contents contained within the Troubleshooting book (step 104 in FIG. 3). As shown in FIG. 7, the user may select the Using Network Management Tools topic 176. After selecting topic 176, further screen displays (not shown) allow the user to pick a particular generic alert error message identifier. As discussed above, with reference to FIG. 3, ERRTXT.DLL will retrieve and display the error message identifier, cause, and action directly from ERROR.TXT.

Figure 9:
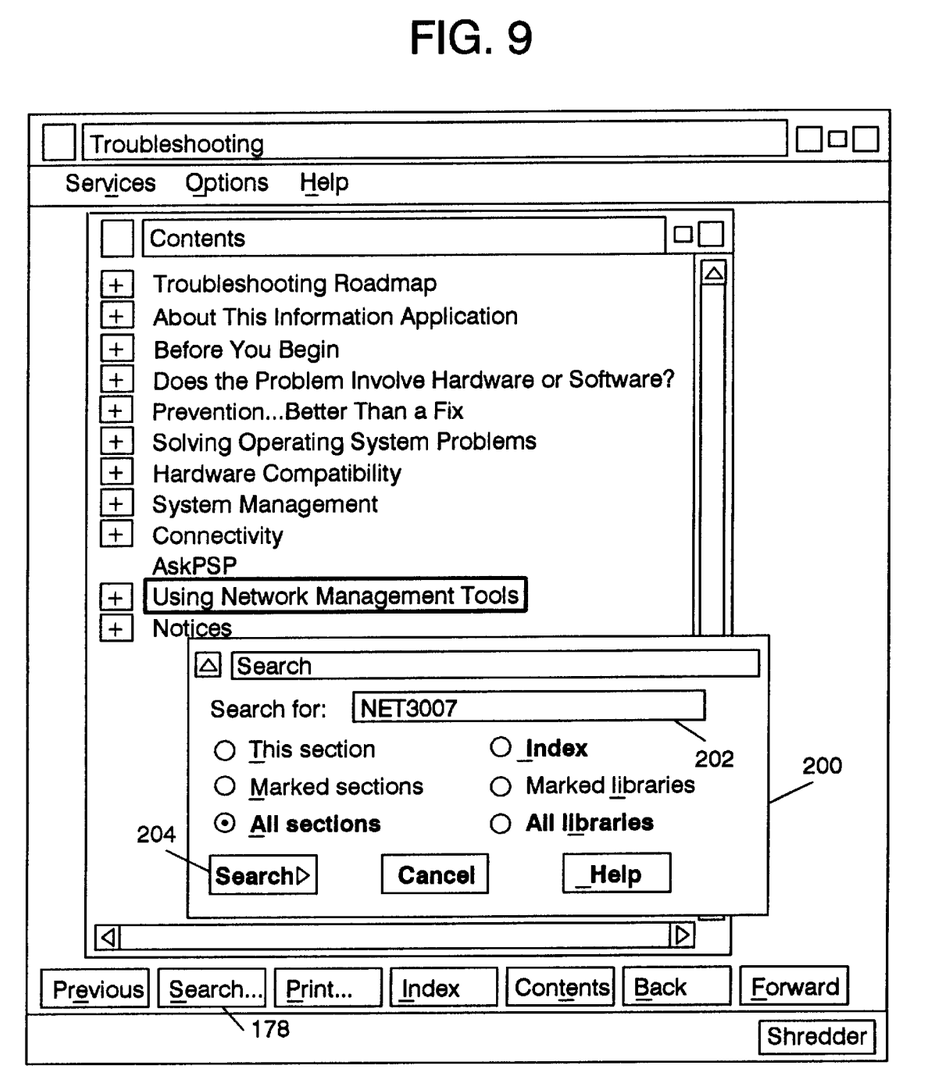
FIGS. 9 and are screen displays depicting the Search Option of the present invention.
Figure 10:
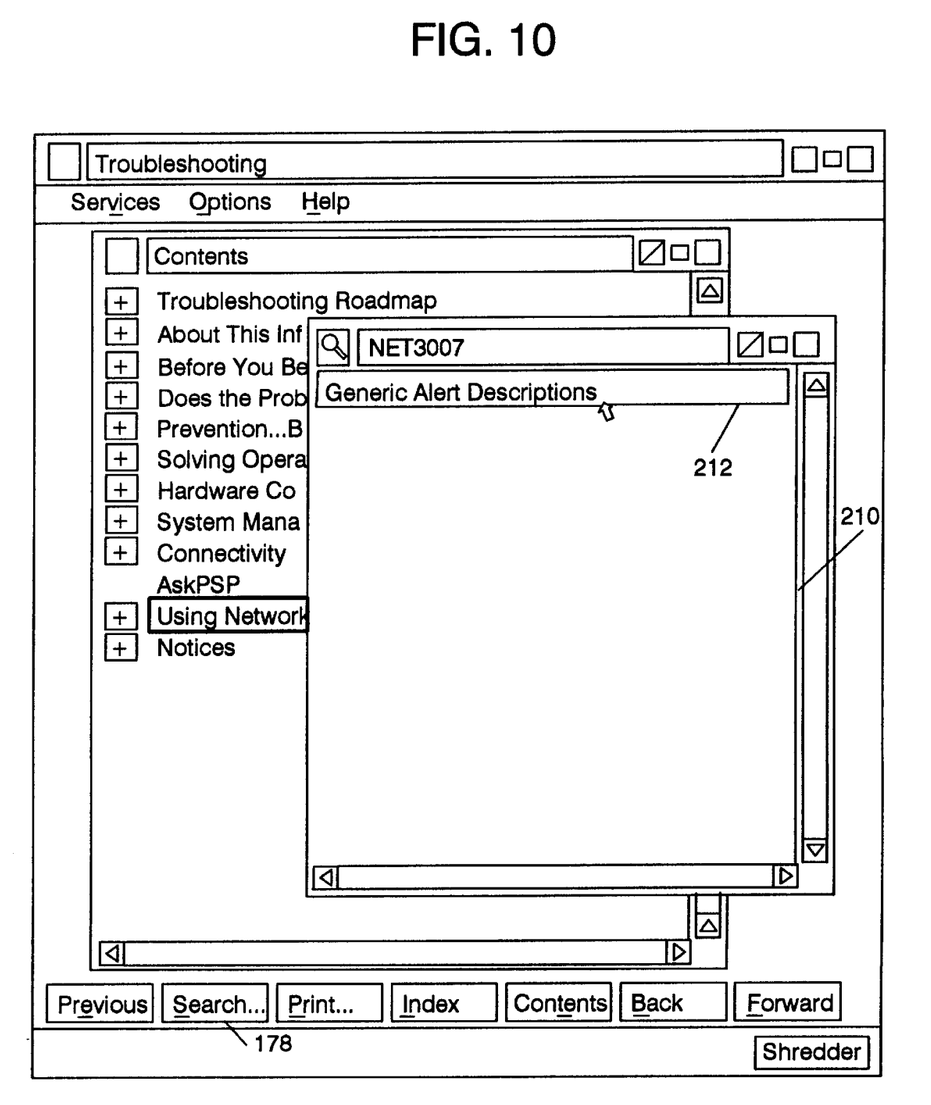
Figure 11:
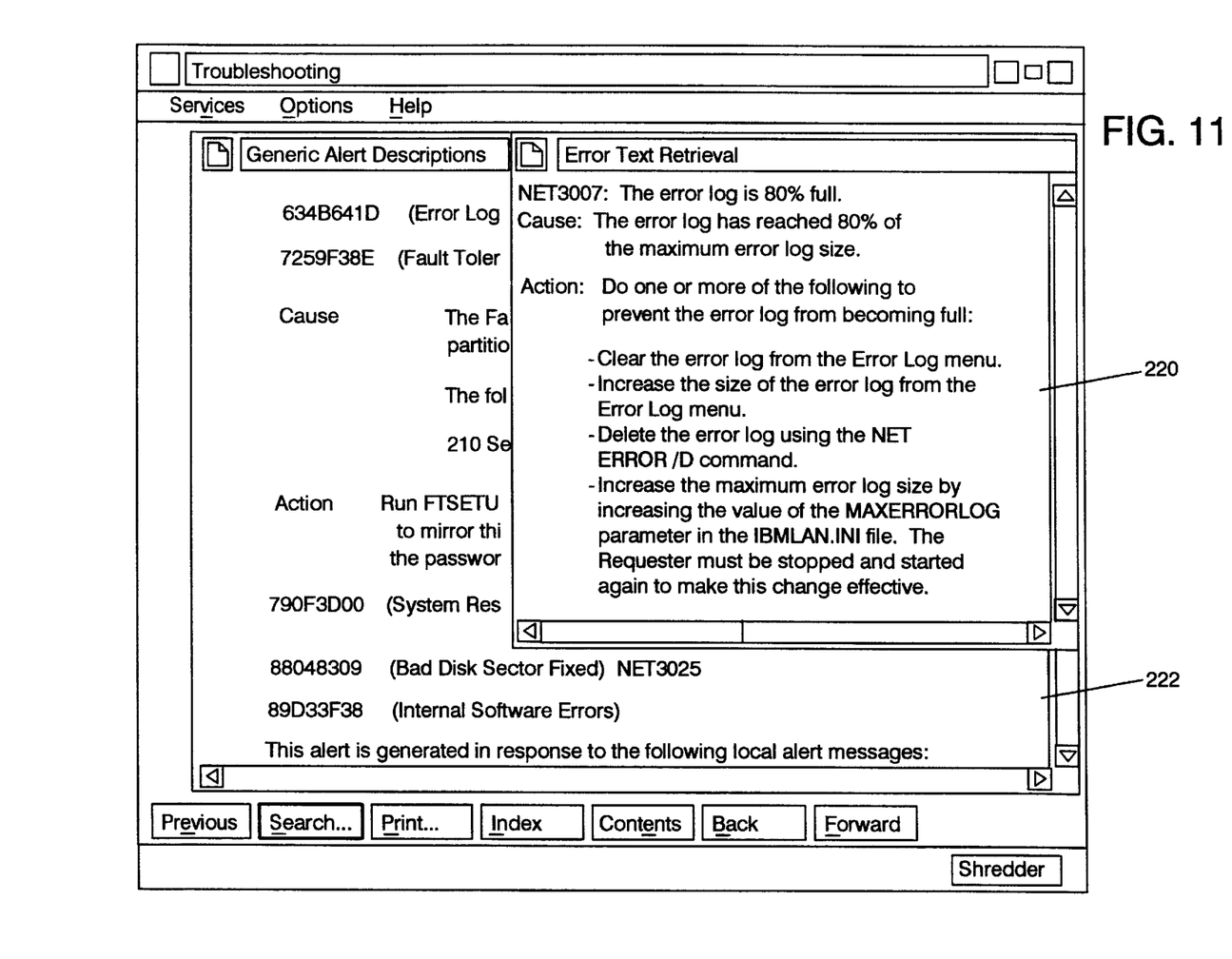
FIG. 11 is a screen display depicting an error ID, cause, and action as presented in accordance with the present invention.

The user may also access ERRTXT.DLL by using a Search Option. As depicted in FIG. 7, the Troubleshooting book contains Search Button 178. Clicking on Search Button 178, causes Search Window 200 to be displayed, as depicted in FIG. 9. Search Window 200 contains "search for" box 202, into which the user may enter either an error ID or an error symptom. In FIG. 9, the user has entered error ID NET3007. The user then clicks on Search Button 204. ERRTXT.DLL searches through ERROR.TXT, and finds all occurrences of NET3007. In this case, the only occurrence of NET3007 is found in a generic alert descriptions section of ERROR.TXT. NET3007 window 210 appears, as depicted in FIG. 10. The user then selects Generic Alert Descriptions 212, which causes error text window 220 to appear, as depicted in FIG. 11. Error text window 220 provides the cause and action messages associated with the NET3007 Generic Alert Description. Note that in the described embodiment, error text window 220 appears as a child window on top of a parent window 222 containing a list of several generic alert error identifiers. Of course, error text window 220 could also be opened directly over NET3007 window 210 in FIG. 10. It would also be possible to open error text window 220 directly over search window 200 (depicted in FIG. 9).

Figure 12:
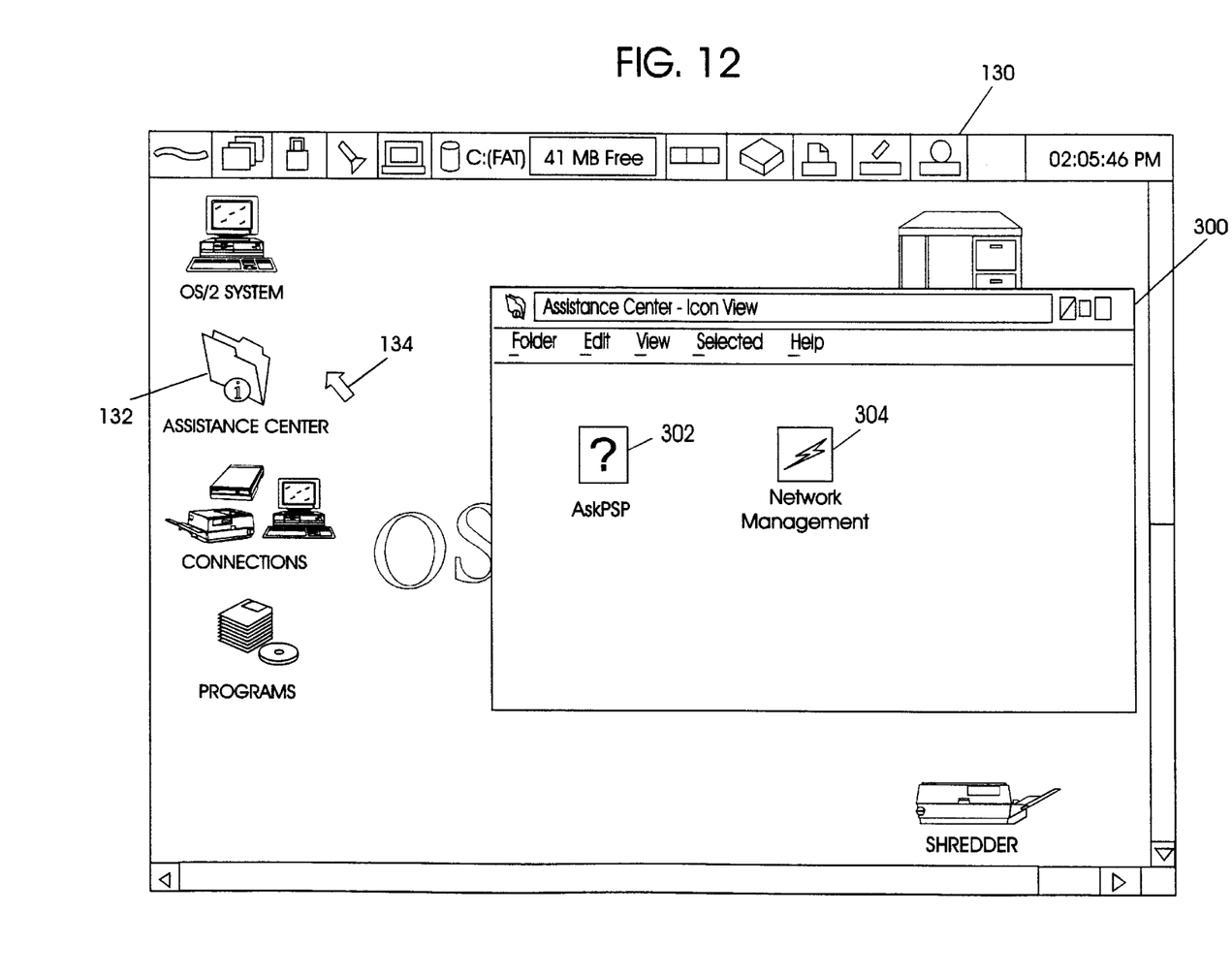
FIG. 12 is an alternate screen display of a window that may be presented to the user after selecting the icon used in FIG. 5 to obtain access to the problem determination system.

Many different screen displays, icons, and windows may be chosen to implement the system and method of the present invention. For example, FIG. 12 depicts an alternate Assistance Center-Icon View window 300, which may be displayed after the user selects Assistance Center icon 132 in FIG. 5. Window 300 contains AskPSP icon 302 and Network Management Tools icon 304. These icons allow the user to access AskPSP or Network Management Tools directly from Assistance Center-Icon View window 300.

The icons and windows of the present invention may be arranged in any manner convenient to the users of the information handling system. For example, programs which are used more often could be accessible directly from the Assistance Center-Icon View window, and programs which are used less often could be accessible through the Troubleshooting-Icon View window. The system and method of the present invention allows problem determination information to be available to the user in a seamless, efficient interface, wherein the interface may be arranged in a manner most convenient to the user.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for determining the cause of a problem in an information handling system, comprising the steps of:

providing a plurality of options for a user to selects, wherein the options are presented in a window, and wherein each option is associated with a problem determination tool;

in response to an option selection, loading an online troubleshooting book;

providing a table of contents from which the user may select a topic;

in response to a first topic selection, performing the steps of:

locating an interactive problem solving program wherever it exists in the system;

executing the interactive problem solving program;

providing a plurality of database options for the user to select;

in response to a database selection, loading one or more selected databases; and conducting an interactive problem determination session utilizing data found in the one or more selected databases; and in response to a second topic selection, performing the steps of:

providing a plurality of error identifiers for the user to select;

in response to a selected error identifier, retrieving the error identifier from a product file; and displaying the error identifier, along with an associated cause and action message.

2. A method according to claim 1, wherein said step of loading the troubleshooting book further comprises:

providing a search option which may be selected;

in response to the search option being selected by the user, performing the following steps:

prompting the user to enter an error identifier;

in response to an entered error identifier, retrieving the error identifier, along with an associated cause and action message from a product file; and displaying the error identifier, cause, and action message on a display means.

3. A method according to claim 2, further comprising:

prompting the user to enter an error symptom; and in response to an entered error symptom, searching for the error symptom and determining an associated error identifier.

4. A method according to claim 1, wherein said step of providing a plurality of options for a user to select further comprises the steps of:

providing as assistance icon for a user to select; and in response to a selection of the assistance icon by the user, providing a plurality of program icons in the window, wherein each program icon is associated with one of the plurality of options.

* * * * *